US012713512B2

(12) United States Patent
Kimura et al.

(10) Patent No.: US 12,713,512 B2
(45) Date of Patent: Aug. 18, 2026

(54) PLASMA TORCH, PLASMA SPRAYING DEVICE, AND METHOD FOR CONTROLLING PLASMA TORCH

(71) Applicant: KINBOSHI INC., Tokyo (JP)

(72) Inventors: Takehiro Kimura, Aichi (JP); So Kimura, Aichi (JP); Yuta Tanaka, Aichi (JP); Atsushi Nose, Aichi (JP)

(73) Assignee: KINBOSHI INC., Tokyo (JP)

( * ) Notice: Subject to any disclaimer, the term of this patent is extended or adjusted under 35 U.S.C. 154(b) by 0 days.

(21) Appl. No.: 18/287,053

(22) PCT Filed: Dec. 27, 2022

(86) PCT No.: PCT/JP2022/048138
§ 371 (c)(1),
(2) Date: Oct. 16, 2023

(87) PCT Pub. No.: WO2023/157488
PCT Pub. Date: Aug. 24, 2023

(65) Prior Publication Data

US 2025/0324506 A1 Oct. 16, 2025

(30) Foreign Application Priority Data

Feb. 16, 2022 (JP) ................................ 2022-022196

(51) Int. Cl.
*H05H 1/40* (2006.01)
*C23C 4/134* (2016.01)
*H05H 1/42* (2006.01)

(52) U.S. Cl.
CPC .............. *H05H 1/40* (2013.01); *C23C 4/134* (2016.01); *H05H 1/42* (2013.01)

(58) Field of Classification Search
CPC ...... C23C 4/134; H05H 1/10–14; H05H 1/40; H05H 1/42
See application file for complete search history.

(56) References Cited

U.S. PATENT DOCUMENTS

| | | | | |
|---|---|---|---|---|
| 6,215,091 | B1 * | 4/2001 | Chung .................... | H05H 1/40 219/121.48 |
| 2018/0247797 | A1 | 8/2018 | Gorokhovsky | |
| 2022/0021290 | A1 | 1/2022 | Mills | |

FOREIGN PATENT DOCUMENTS

| | | | |
|---|---|---|---|
| CN | 112410717 | A | 2/2021 |
| DE | 141932 | A1 | 5/1980 |

(Continued)

OTHER PUBLICATIONS

Japanese Patent Application No. 2022-022196, Notice of Reasons for Refusal, dated Apr. 21, 2022.

(Continued)

*Primary Examiner* — Benjamin Kendall
(74) *Attorney, Agent, or Firm* — MARSHALL, GERSTEIN & BORUN LLP

(57) ABSTRACT

The plasma torch according to the present invention rotates the generated plasma P along the central axis T and ejects it in the axial direction, and also causes the plasma P to melt the powder of the thermal spray material and discharge it to the outside from the front nozzle opening. The current vector and the magnetic flux vector are orthogonal. A vector of current flowing between the first discharge surface 39 of the cathode 36 and the second discharge surface 49 of the second electrode 41 in order to generate plasma P, and a vector of magnetic flux of a magnetic field synthesized by the first magnet 37, the second magnet 42, the third magnet M3, and the fourth magnet M4, are orthogonal.

18 Claims, 8 Drawing Sheets

(56) References Cited

FOREIGN PATENT DOCUMENTS

| | | | |
|---|---|---|---|
| JP | S5546266 | A | 3/1980 |
| JP | H0621010 | A | 1/1994 |
| JP | H08319552 | A | 12/1996 |
| JP | H11 173517 | A | 6/1999 |
| JP | 2000-096247 | A | 4/2000 |
| JP | 2011071081 | A | 4/2011 |
| JP | 5799153 | B1 | 10/2015 |
| JP | 2016069711 | A | 5/2016 |
| JP | 2016085811 | A | 5/2016 |
| KR | 20030003827 | A | 1/2003 |
| KR | 20120029495 | A | 3/2012 |
| KR | 101616487 | B1 | 4/2016 |
| TW | 202007781 | A | 2/2020 |

OTHER PUBLICATIONS

International Application No. PCT/JP2022/048138, International Search Report, mailed Mar. 7, 2023.

Canadian Patent Application No. 3216519, Office Action, dated Dec. 18, 2024.

South Korean Notification of Reason for Refusal, corresponding South Korean Application No. 10-2023-7014671, mailing date Jun. 18, 2024.

Taiwanese Application No. 111150301, Office Action and with English translation, mailed Jul. 22, 2024.

International Application No. PCT/JP2022/048138, International Preliminary Report on Patentability and Written Opinion, mailed Aug. 29, 2024.

Extended European Search Report issued Jan. 26, 2026 in corresponding EP application No. 22927370.1 (6 pages).

Office Action issued Jan. 29, 2026 in corresponding Chinese Patent Application No. 202280007205.5.

Examination Report issued Feb. 24, 2026 in corresponding Indian Patent Application No. 202317068693.

* cited by examiner

PLASMA TORCH, PLASMA SPRAYING DEVICE, AND METHOD FOR CONTROLLING PLASMA TORCH

TECHNICAL FIELD

The present invention relates to a plasma torch, a plasma thermal spraying device, and a controlling method for the plasma torch.

BACKGROUND TECHNOLOGY

Plasma spraying, which creates a film on a surface of an object, has been put into practical use as a method for forming a film that provides heat resistance, corrosion resistance, abrasion resistance, etc. on the surface of the substrate, by melting a powder of thermal spray materials such as metals, alloys, inorganic materials, or ceramics using the radiant heat of the plasma arc generated by a plasma torch, and spraying this powder onto the surface of the object such as a metal substrate.

A plasma torch includes, for example, a ring cathode, an anode, the anode being arranged in a continuous manner with a discharge space between the anode and the ring cathode, and a plurality of magnets that form intersecting magnetic flux in a plane including a central axis in a discharge space.

In this plasma torch, a voltage is applied between electrodes within the plasma torch while supplying a plasma generation gas around the ring cathode. Thereby, a columnar plasma arc is generated by discharging between the electrodes, and the generated plasma arc is rotated at high speed in a circumferential direction of the plasma torch with a plurality of magnets, thereby generating a plasma jet.

Here, for example, the powder of thermal spray material is supplied into the plasma jet from a hollow of the ring cathode using gas as a medium along approximately the central axis of the discharge space. The generated plasma arc melts the thermal spray material and sprays it onto the surface of the object (e.g., see Patent Documents 1 and 2).

As described in Patent Documents 1 and 2 above, in a plasma torch that simply rotates the plasma arc, plasma generation gas is supplied into the plasma jet. As a result, the powder of the thermal spray material introduced from a thermal spray material supply port in the center of the ring cathode deviates from the central axis of the discharge space due to the influence of a swirling gas flow of the plasma generation gas. This may cause a molten thermal spray material to adhere to an inner surface (discharge surface) of the anode. In particular, depending on the properties of the thermal spray material, such as a specific gravity and particle size of the thermal spray material powder, the thermal spray material molten under the influence of the swirling gas flow is more likely to adhere to the discharge surface of the anode. Furthermore, in such conventional plasma torches, the thermal spray material has a low melting efficiency, and the thermal spray material may not be fully utilized for forming the film. It is noted that melting efficiency refers to the rate at which the molten thermal spray material is emitted from the plasma torch.

Therefore, there is a need for a plasma torch that can suppress damage on the electrode while stably improving the melting efficiency of thermal spray material, in order to further improve the efficiency of forming films made of various thermal spray materials on the surface of substrates using plasma.

Thus, a plasma torch e.g., as described in Patent Document 3 has been proposed. In the arrangement of the electrodes and magnets for generating plasma in the plasma torch described in Patent Document 3, a direction of rotation of the pole of discharge and a vector of the magnetic flux of the current and magnetic field that determine a magnitude of force are not orthogonal to each other. Therefore, a vector product of the current and the magnetic flux of the magnetic field becomes unstable, and the rotation direction of the pole point is reversed or the pole point does not rotate. As a result, there is a problem in that the poles become stuck and the heat becomes concentrated.

Furthermore, in the plasma torch described in Patent Document 3, if the vector product of the current and the magnetic flux of the magnetic field is unstable, a thermal spray material introduction pipe (injector) that supplies thermal spray material into the discharge space momentarily becomes a discharge path, a discharge current flows into the thermal spray material introduction pipe, and there is a problem where the thermal spray material introduction pipe melts.

PRIOR ART

Patent Document

[Patent Document 1] JP H8-319552 A
[Patent Document 2] JP 2011-071081 A
[Patent Document 3] JP 5799153 B

OUTLINE OF THE INVENTION

Problems to be Solved by the Invention

The present invention has been made in view of the above-mentioned problems, where a plasma torch, a plasma thermal spraying device, and a method of controlling a plasma torch are provided capable of stabilizing a rotation of the pole of discharge by maintaining an orthogonality of the vector product of a current for generating plasma and a magnetic flux of a magnetic field, which is also possible to suppress damage on a thermal spray material introduction tube.

Means for Solving the Problem

In order to solve the above problems, a plasma torch according to the present invention rotates a generated plasma along a central axis, ejects the plasma in an axial direction, melts a powder of a thermal spraying material with the plasma, and expels the molten powder from the front nozzle opening to outside, where the plasma torch comprises:

- a first electrode formed in a cylindrical shape having a first through hole extending in the axial direction at a center, the first electrode having a first discharge surface continuously formed around a front end of the first through hole;
- a second electrode formed in a cylindrical shape having a second through hole extending in the axial direction at a center and located on a front side of the first electrode, the second electrode having a second discharge surface continuously formed around a rear end of the second through hole so as to face the first discharge surface of the first electrode;
- a first magnet provided on a rear side of the first electrode opposite to the first discharge surface;

a second magnet provided on an outer periphery of the second electrode;

a third magnet provided on a front side of the second electrode opposite to the second discharge surface;

a fourth magnet provided on an outer periphery of the first electrode and facing the second magnet in the axial direction;

a thermal spray material introduction pipe slidably provided in the first through hole along the central axis, that supplies thermal spray material powder from a supply port to a discharge space formed between the first electrode and the second electrode; and a plasma generation gas supply passage that supplies plasma generation gas to the discharge space from the outer peripheral side of the first electrode, wherein a vector, of current flowing between the first discharge surface of the first electrode and the second discharge surface of the second electrode to generate the plasma, and a vector, of magnetic flux of a combined magnetic field by the first magnet, the second magnet, the third magnet, and the fourth magnet, are orthogonal.

In the plasma torch, the first electrode is arranged as a mirror image of the second electrode with respect to a plane passing between the first electrode and the second electrode and orthogonal to the central axis, and the first discharge surface of the first electrode is positioned as a mirror image of the second discharge surface of the second magnet with respect to the plane.

In the plasma torch, the first magnet is arranged as a mirror image of the third magnet with respect to the plane, and the vector of magnetic flux of the magnetic field of the first magnet is positioned as a mirror image of the vector of magnetic flux of the magnetic field of the third magnet with respect to the plane.

In the plasma torch, the second magnet is arranged as a mirror image of the fourth magnet with respect to the plane, and the vector of magnetic flux of the magnetic field of the second magnet is a mirror image of the vector of magnetic flux of the magnetic field of the fourth magnet with respect to the plane.

In the plasma torch, the first magnet is arranged inside the first electrode in a region between the first through hole and the outer periphery, and the third magnet is arranged inside the second electrode in a region between the second through hole and the outer periphery.

In the plasma torch, the fourth magnet is continuously formed so as to surround the front end of the first electrode, and the second magnet is continuously formed so as to surround the rear end of the second electrode.

In the plasma torch, the first magnet has a cylindrical shape with a through hole extending in the axial direction centered on the central axis, the second magnet has a cylindrical shape with a through hole extending in the axial direction centered on the central axis, the third magnet has a cylindrical shape with a through hole extending in the axial direction centered on the central axis, and the fourth magnet has a cylindrical shape with a through hole extending in the axial direction centered on the central axis.

In the plasma torch, the first discharge surface of the first electrode and the second discharge surface of the second electrode are inclined, such that a gap between the first discharge surface of the first electrode and the second discharge surface of the second electrode widens toward the central axis.

In the plasma torch, a magnitude of the inclination of the first discharge surface with respect to the plane orthogonal to the central axis is the same as a magnitude of the inclination of the second discharge surface with respect to the plane.

In the plasma torch, the plasma generation gas supply passage supplies the plasma generation gas, from between the fourth magnet and the outer periphery of the first electrode, toward between the first discharge surface of the first electrode and the second discharge surface of the second electrode.

The plasma torch, further comprises a sheath gas supply passage that supplies sheath gas from the sheath gas supply port toward the discharge space from around the supply port of the thermal spray material introduction pipe.

In the plasma torch, a plurality of the sheath gas supply ports of the sheath gas supply passage are provided at equal intervals, around the supply port of the thermal spray material introduction pipe.

In the plasma torch, the sheath gas g is the same gas as the plasma generation gas or a different gas from the plasma generation gas.

In the plasma torch, the sheath gas is a gas containing one or more selected from a group containing noble gas elements, nitrogen, and hydrogen.

In the plasma torch, a position of the supply port of the thermal spraying material introduction pipe is adjusted depending on the type of the thermal spraying material.

In the plasma torch, the position of the supply port of the thermal spray material introduction pipe is adjusted so that the position of the supply port is within the discharge space.

In order to solve the above problems, a plasma thermal spraying device according to the invention, comprising:

the plasma torch;

a power source that applies a voltage between the first electrode and the second electrode; and a thermal spray material conveyance unit that conveys the thermal spray material to the thermal spray material introduction pipe.

In order to solve the above problems, a control method for a plasma torch, by using the plasma torch according to the invention, by sliding the thermal spraying material introduction pipe in the axial direction and adjusting the position of the supply port of the thermal spraying material introduction pipe according to the type of the thermal spraying material, is provided to melt the powder of the thermal spray material.

EFFECT OF THE INVENTION

According to the present invention, it is possible to maintain the orthogonality of the vector product of the current for generating plasma and the magnetic flux of the magnetic field, to stabilize the rotation of the pole of the discharge, and to suppress the consumption of the thermal spray material introduction pipe.

MODE FOR CARRYING OUT THE INVENTION

Hereinafter, modes for carrying out the present invention (hereinafter referred to as embodiments) will be described in detail based on the drawings. In this embodiment, a case where a plasma torch is applied to a plasma thermal spraying device will be described. It is noted that the present invention is not limited to the following embodiments. That is, the plasma torch according to the present invention can be applied to a wide variety of applications such as thermal spraying, melting, and gas heating. Furthermore, the constituent elements in the embodiments described below include those that can be easily assumed by those skilled in the art, and those that are substantially the same. Furthermore, the components disclosed in the embodiments below can be combined as appropriate.

Plasma Thermal Spraying Device

A plasma thermal spraying device applied with a plasma torch according to the present invention will be described.

Figure 1:
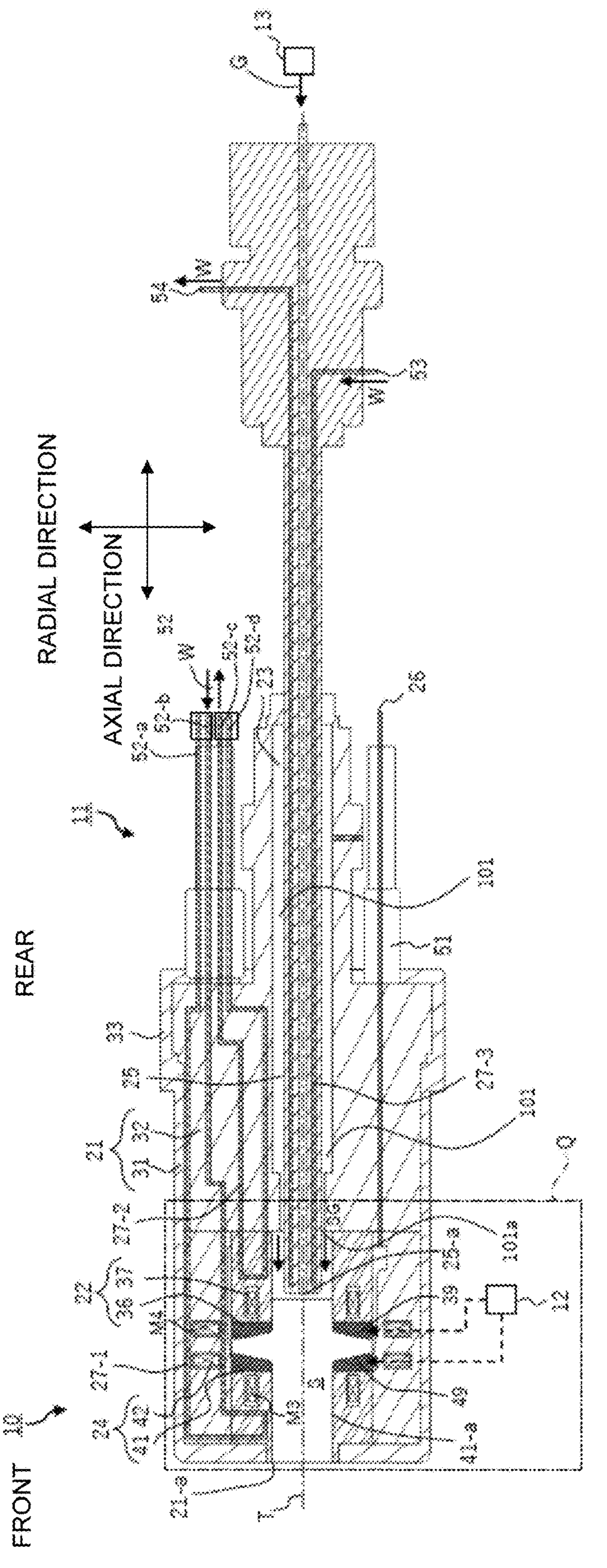
FIG. 1 is a diagram showing the configuration of a plasma torch according to an embodiment of the present invention.
Figure 2:
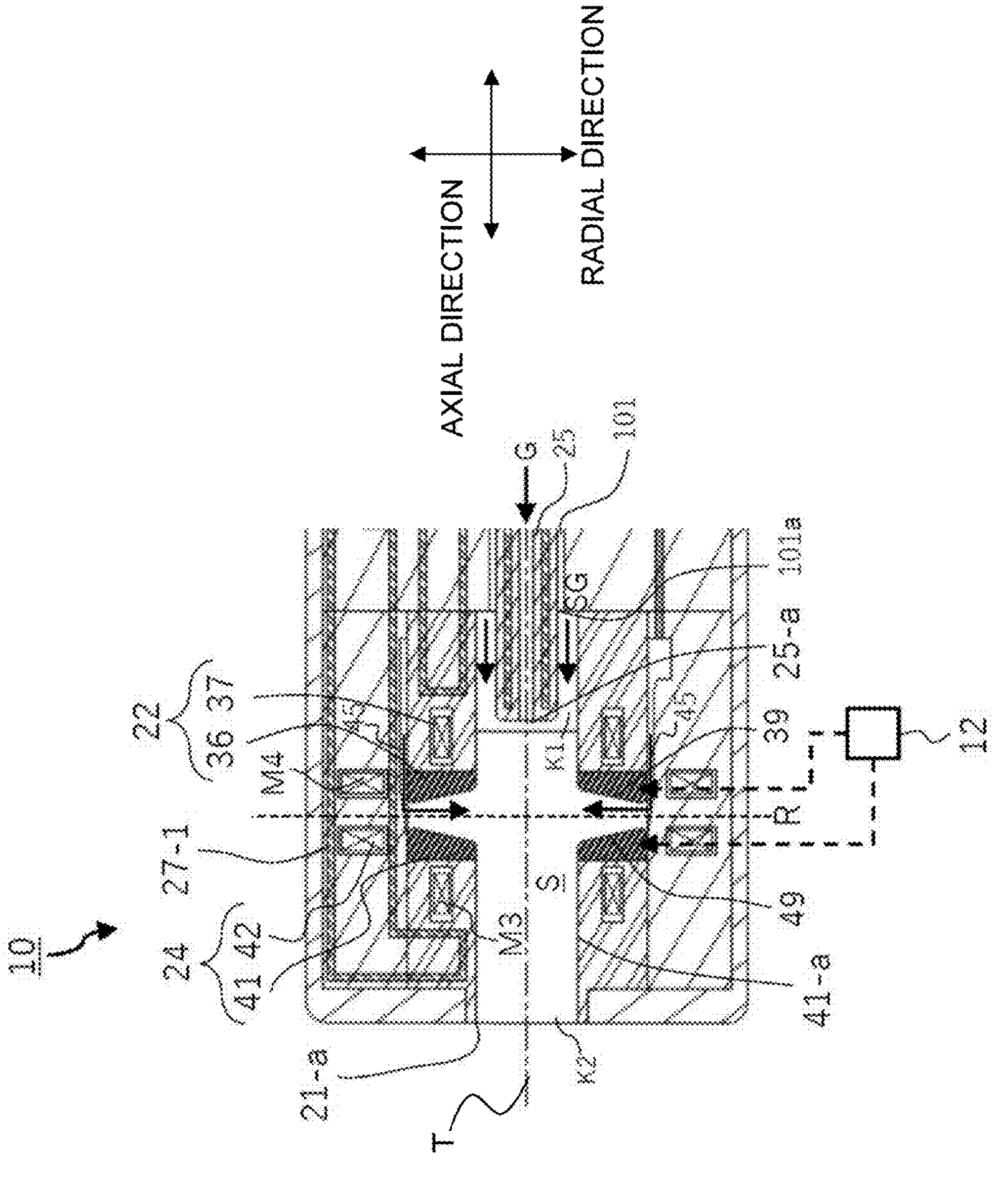
FIG. 2 is a partially enlarged view of region Q of the plasma torch shown in FIG. 1.
Figure 3:
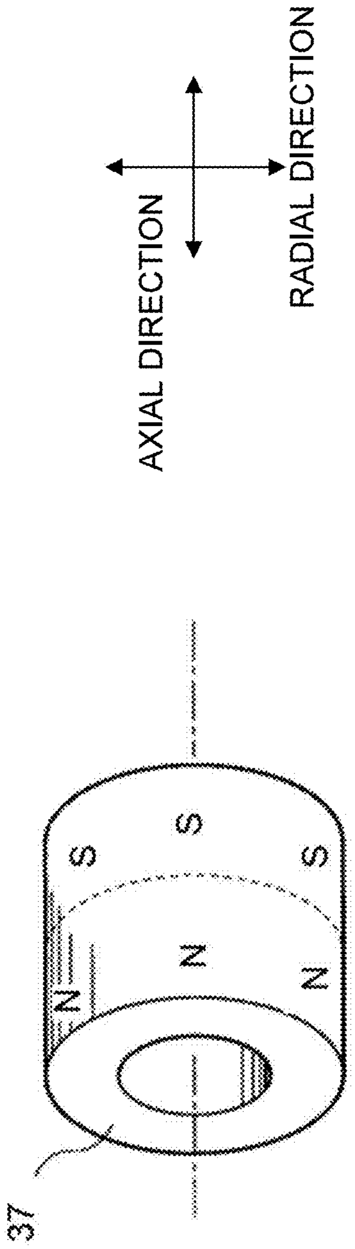
FIG. 3 is a diagram showing the shape of the first magnet shown in FIG. 1.
Figure 4:
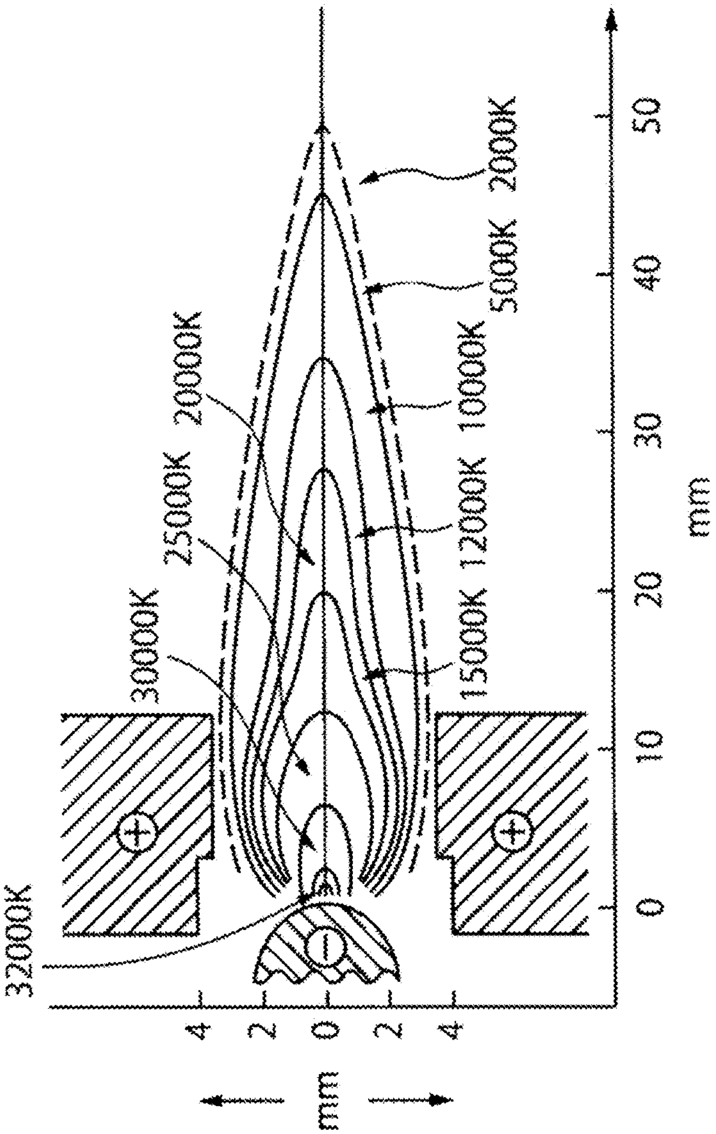
FIG. 4 is a diagram showing an example of the temperature distribution of a plasma jet.
Figure 5:
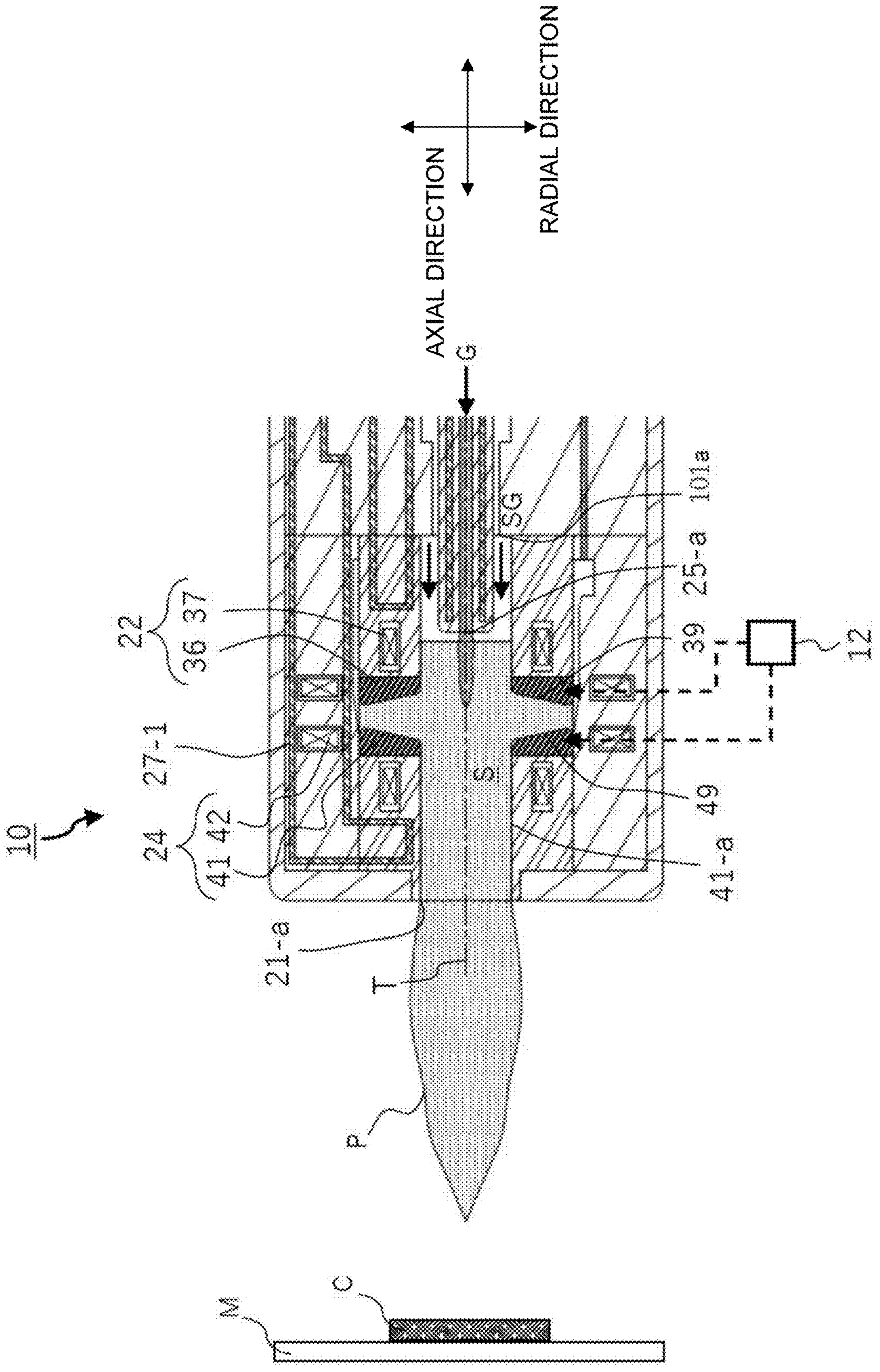
FIG. 5 is an explanatory diagram showing a state in which the plasma torch 11 shown in FIG. 1 generates plasma.
Figure 6:
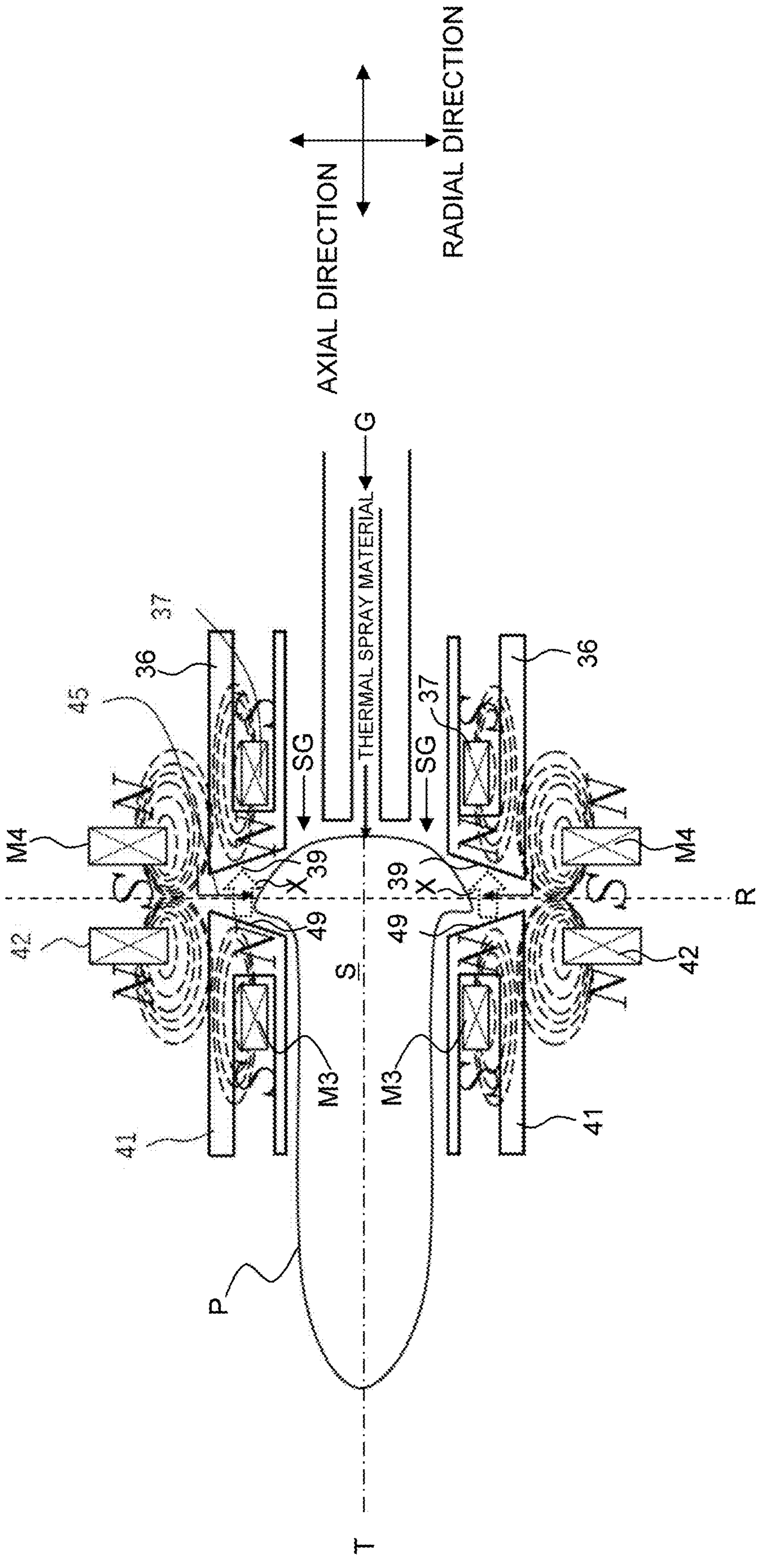
FIG. 6 is an explanatory diagram showing the state of magnetic flux of the plasma torch 11 shown in FIG. 1.

FIG. 1 is a diagram showing the configuration of a plasma torch based on the embodiment of the present invention. Moreover, FIG. 2 is a partially enlarged view of region Q of the plasma torch shown in FIG. 1. Moreover, FIG. 3 is a diagram showing a shape of the first magnet shown in FIG. 1. Moreover, FIG. 4 is a diagram showing an example of a temperature distribution of a plasma jet. Furthermore, FIG. 5 is an explanatory diagram showing a state in which the plasma torch 11 shown in FIG. 1 generates plasma. Furthermore, FIG. 6 is an explanatory diagram showing a state of magnetic flux of the plasma torch 11 shown in FIG. 1.

For example, as shown in FIGS. 1 and 2, a plasma thermal spraying device 10 according to this embodiment includes a plasma torch 11, a power source 12, and a thermal spray material conveyance device (thermal spray material conveyance section) 13.

Plasma Torch

The plasma torch 11 includes a torch body 21, a cathode block 22, an insulating section 23, an anode block 24, a thermal spray material introduction pipe 25, a plasma generation gas supply passage 26, cooling water supply passages 27-1 to 27-3, and a sheath gas supply passage 101. It is noted that the torch body 21 and the cathode block 22 are electrically and thermally insulated.

In addition, in this embodiment, a direction of the central axis of the cylindrical shape of the electrode used in the cathode block 22 and the anode block 24 is defined as an “axial direction”, and a direction of the diameter of the cylindrical electrode is defined as a “radial direction”.

For example, as shown in FIGS. 1, 2, 5, and 6, the plasma torch 11 is configured to eject the generated plasma P in the axial direction while rotating it along the central axis T, and is configured to melt the powder of thermal spray material using plasma P and discharge it to the outside from the nozzle port 21-*a* in the front.

The torch body 21 is formed into a cylindrical shape. The torch body 21 includes an outer cylinder 31 having a nozzle opening 21*a* at its tip (left end in FIG. 1), and an inner cylinder 32 provided inside the outer cylinder 31. The torch body 21 is formed using a copper alloy or the like having good thermal conductivity and electrical conductivity. An insulating layer may be provided between the torch body 21 and the anode block 24. One end of the torch body 21 is covered with a cap 33.

The inner cylinder 32 is provided with a plasma generation gas supply passage 26 and cooling water supply passages 27-1 to 27-3 therein.

For example, as shown in FIGS. 1 and 2, the cathode block 22 includes a cathode (a first electrode) 36, a first magnet 37, and a fourth magnet M4.

As shown in FIGS. 1 and 2, for example, the cathode 36 is formed into a cylindrical shape having a first through hole K1 extending in the axial direction at the center. Furthermore, this cathode 36 has a first discharge surface 39 that is continuously formed around the front end of the first through hole K1.

Furthermore, the first magnet 37 is provided behind the cathode 36, for example, as shown in FIGS. 1 and 2. That is, the first magnet 37 is provided on the rear side of the cathode 36 opposite to the first discharge surface 39, for example, as shown in FIGS. 1 and 2. In particular, the first magnet 37 is arranged inside the cathode 36 in a region between the first through hole K1 and the outer periphery. The first magnet M1 is cooled by the cooling water of the surrounding cooling channel so as not to exceed the Curie point temperature, In the example shown in FIGS. 1 and 2, the first magnet 37 has a cylindrical shape with a through hole extending in the axial direction centered on the central axis T.

Here, for example, as shown in FIG. 3, the first magnet 37 has a through hole in the center and is formed in a cylindrical shape (ring shape). In addition, in FIG. 3, along the central axis of the first magnet 37, one side is set as a N pole and the other side is set as a S pole (the upper direction in FIG. 3 is the N pole, and the lower direction is the S pole), however, along the central axis of the first magnet 37, one side may be set as the south pole and the other side may be set as the north pole.

Furthermore, the fourth magnet M4 is provided on the outer periphery of the cathode 36, for example, as shown in FIGS. 1 and 2, and is arranged to face the second magnet 42 in the axial direction. In particular, the fourth magnet M4 is continuously formed so as to surround the 36 tips of the cathode. A plurality of fourth magnets M4 may be arranged in a cylindrical shape (a ring shape). In this embodiment, one row of fourth magnets M4 is provided in the radial direction, but the number can be set to any number as appropriate.

It is noted that, like the first magnet 37, the fourth magnet M4 may be formed in a cylindrical shape. In this case, the fourth magnet M4 has a cylindrical shape with a through hole extending in the axial direction centered on the central axis T.

Furthermore, the insulating section 23 is provided on the outer periphery of the thermal spray material introduction pipe 25. As the insulating section 23, an insulating material having heat resistance is used.

Furthermore, the anode block 24 includes an anode (second electrode) 41, a second magnet 42, and a third magnet M3.

For example, as shown in FIGS. 1 and 2, the anode 41 is provided on the inner peripheral wall of the torch body 21, has a cylindrical shape with a second through hole K2 extending in the axial direction at the center, and is located in front of the cathode 36. Furthermore, this anode 41 has a second discharge surface 49 continuously formed around the rear end of the second through hole K2 so as to face the first discharge surface 39 of the cathode 36.

Furthermore, the second magnet 42 is provided on the outer periphery of the anode 41, for example, as shown in FIGS. 1 and 2. In particular, the second magnet 42 is continuously formed so as to surround the tip of the anode 41. A plurality of second magnets 42 may be arranged in a cylindrical shape (ring shape). It is noted that in this embodiment, the second magnets 42 are provided in one row in the radial direction, but the number may be any number as appropriate.

It is noted that, like the first magnet 37, the second magnet 42 may be formed in a cylindrical shape. In this case, the second magnet 42 has a cylindrical shape with a through hole extending in the axial direction centered on the central axis T.

In the examples shown in FIGS. 1 and 2, the second magnet 42 and the fourth magnet M4 have the same cylindrical inner diameter.

Furthermore, the third magnet M3 is provided, for example, on the front side of the anode 41 opposite to the second discharge surface 49, as shown in FIGS. 1 and 2. In particular, this third magnet M3 is arranged inside the anode 41 in a region between the second through hole K2 and the outer periphery, so that the third magnet M3 is cooled by the cooling water of the surrounding cooling channel so as not to exceed the Curie point temperature.

It is noted that, like the first magnet 37, the third magnet M3 may be formed in a cylindrical shape. In this case, the third magnet M3 has a cylindrical shape with a through hole extending in the axial direction centered on the central axis T.

In the examples shown in FIGS. 1 and 2, the cylindrical third magnet M3 and the first magnet 37 have the same inner diameter.

Here, for example, as shown in FIGS. 1, 2, and 6, the above-mentioned cathode 36 is arranged in mirror image (plane symmetric) with the anode 41, regarding a plane R passing between the cathode 36 and the anode 41 and orthogonal to the central axis T, Furthermore, as shown in FIG. 2, the first discharge surface 39 of the cathode 36 is positioned as a mirror image (plane symmetric) of the second discharge surface 49 of the second magnet 41, regarding plane R.

Here, in the conventional technology, for example, to start a DC discharge between electrodes having a gap, first a high frequency voltage is applied between the electrodes to break the insulation in the electrode space and cause a spark discharge. Immediately after that, a DC voltage is superimposed between the electrodes to transition to DC discharge. Usually, the gap between the electrodes is set to a size commensurate with the rated voltage of the DC power supply, but if this gap is large, high-frequency spark discharge becomes difficult. For this reason, the gap is set by mechanical operation so that it is small at the time of ignition and changes to a gap suitable for the rated voltage once the DC discharge starts.

However, in this embodiment, for example, as shown in FIGS. 1 and 2, the first discharge surface 39 of the cathode 36 and the second discharge surface 49 of the anode 41 are inclined (in the radial direction) so that the gap between the first discharge surface 39 of the cathode 36 and the second discharge surface 49 of the anode 41 widens from the outer circumferential side toward the central axis T, from a size that allows ignition by high-frequency spark discharge to a size commensurate with the rated voltage, As a result, this embodiment achieves a transition from ignition by high-frequency spark discharge to application of rated voltage without performing mechanical operations unlike conventional technology.

For example, as shown in FIGS. 1 and 2, the magnitude of the inclination of the first discharge surface 39 with respect to the plane R orthogonal to the central axis T is the same as the magnitude of the inclination of the second discharge surface 49 with respect to the plane R.

Furthermore, for example, as shown in FIGS. 1, 2, and 6, the first magnet 37 is arranged in mirror image (plane symmetric) with the third magnet M3 with respect to the plane R. Furthermore, the vector of the magnetic flux of the magnetic field of the first magnet 37 is positioned as a mirror image (plane symmetric) of the vector of the magnetic flux of the magnetic field of the third magnet M3 with respect to the plane R.

In particular, for example, as shown in FIGS. 1, 2, and 6, with respect to the plane R, the second magnet 42 is arranged in mirror image (plane symmetric) with respect to the fourth magnet M4. In particular, with respect to the plane R, the vector of the magnetic flux of the magnetic field of the second magnet 42 is positioned as a mirror image (plane symmetric) of the vector of the magnetic flux of the magnetic field of the fourth magnet M4.

With this configuration, for example, as shown in FIG. 6, the vector, of current X to be passed between the first discharge surface 39 of the cathode 36 and the second discharge surface 49 of the anode 41 in order to generate plasma P, and The vector, of the magnetic fluxes of the combined magnetic fields of the first magnet 37, the second magnet 42, the third magnet M3, and the fourth magnet M4, are orthogonal to each other.

Also, for example, as shown in FIGS. 1 and 2, the thermal spray material introduction pipe 25 is slidably provided in the first through hole K1 along the central axis T, and supplies thermal spray material powder to the discharge space S formed between the cathode 36 and the anode 41 from the supply port 25-*a*.

More specifically, for example, as shown in FIGS. 1 and 2, the thermal spray material introduction pipe 25 is provided on the inner periphery of the cathode 36 via the insulating section 23, and the axis of the thermal spray material introduction pipe 25 is provided to coincide with the axis of the cathode 36. The thermal spray material introduction pipe 25 is provided at its tip with a supply port 25-*a* for supplying thermal spray material powder (thermal spray powder) onto the central axis T of the cathode 36. The thermal spray material introduction pipe 25 is connected to the thermal spray material conveyance device 13, the thermal spray powder is carried along with the carrier gas from the thermal spray material conveyance device 13 and is supplied onto the central axis T of the cathode 36 through the thermal spray material introduction pipe 25.

Examples of thermal spray materials include, for instance, oxide ceramics such as alumina, zirconia, and titania, carbide ceramics such as tungsten carbide (WC), non-oxide ceramics such as silicon nitride, and metals such as aluminum, niobium, and silicon.

The thermal spray material introduction pipe 25 is provided in the through hole of the cathode 36 so as to be slidable in the axial direction of the thermal spray material introduction pipe 25. The position of the supply port 25*a* of the thermal spray material introduction pipe 25 is adjusted depending on the material used. The thermal spray material introduction pipe 25 can be slid using an air cylinder, an electric cylinder, or the like. Thereby, the supply port 25*a* of the thermal spray material introduction pipe 25 can be easily and continuously positioned while sliding the thermal spray material introduction pipe 25.

In addition, in order to slide the thermal spray material introduction pipe 25 in the through hole of the cathode 36 and the insulating section 23 in the axial direction of the thermal spray material introduction pipe 25, it is preferable that the surface of the thermal spray material introduction pipe 25 is processed so that the sliding resistance on the surface thereof is reduced. As the surface processing method, for example, grinding using a lathe, buffing, polishing using a grinding stone, electrolytic polishing, chemical cleaning, etc. can be used. The surface treatment may be performed using these types alone or in combination.

In this embodiment, the supply port 25-*a* of the thermal spray material introduction pipe 25 is fixed with a fixing member after sliding the thermal spray material introduction pipe 25 in the axial direction and determining the position.

Here, the position of the supply port 25-*a* of the thermal spray material introduction pipe 25 is adjusted depending on the type of thermal spray material, average particle diameter, physical properties (for example, melting point, specific heat, thermal conductivity, etc.). As already mentioned, FIG. 4 shows an example of the temperature distribution of the plasma jet. As shown in FIG. 4, the central part of the plasma jet is at an extremely high temperature of 10,000° C. or more, and the surrounding area is at a high temperature of about 1500 to 2000° C. Therefore, the position of the supply port 25*a* is adjusted depending on the type, average particle diameter, physical properties (e.g., melting point, specific heat, thermal conductivity, etc.), etc. of the thermal spray material so that the thermal spray powder can be molten efficiently. Thereby, the coating C of the sprayed powder can be efficiently formed on the surface of the substrate M.

In this embodiment, the position of the supply port 25-*a* of the thermal spray material introduction pipe 25 can be determined by using a previously created diagram (correlation diagram) showing the correlation between the type of thermal spray material, average particle size, physical properties (e.g., melting point, specific heat, thermal conductivity, etc.) and the position where the thermal spray material supplied from the thermal spray material introduction pipe 25 is spouted in a molten state.

Such a correlation diagram can be obtained, for example, as follows. First, when a specific thermal spray material is introduced into plasma, the time required for the thermal spray material to melt to the core is determined, depending on the type of specific thermal spray material, average particle size, physical properties (e.g., melting point, specific heat, thermal conductivity, etc.).

Then, the position where the thermal spray material supplied from the thermal spray material introduction pipe 25 is ejected in a molten state is determined based on the time required for the thermal spray material to melt. As a result, a correlation diagram as described above is obtained.

Furthermore, even when using a thermal spray material other than the thermal spray material registered in the correlation diagram, the time required for the other thermal spray material to melt is determined. Then, from the ratio of the obtained time to the time required for the thermal spray material accumulated in the correlation diagram to melt, it is possible to determine the position where the thermal spray material is ejected in a molten state.

For example, when the thermal spray material is metal powder, the melting point of the metal is generally lower than that of ceramics. For this reason, the supply port 25-*a* of the thermal spray material introduction pipe 25 is preferably provided closer to the anode block 24 than the plane R.

Furthermore, when the thermal spray material is ceramic powder, the melting point of ceramic is generally higher than that of metal. For this reason, the supply port 25-*a* of the thermal spray material introduction pipe 25 is preferably provided closer to the cathode block 22 than the plane R.

In this way, the position of the supply port 25-*a* of the thermal spray material introduction pipe 25 is adjusted depending on the type of thermal spray material. This allows the thermal spray powder to be molten and discharged more reliably.

Incidentally, the melting point of the metal powder targeted by the plasma torch 11 according to this embodiment is, for example, about 650 to 2500° C. As the metal powder, for example, aluminum (melting point: about 660° C.), niobium (melting point: about 2468° C.), etc. are used.

Furthermore, the melting point of the ceramic powder targeted by the plasma thermal spraying device 10 is, for example, about 2000 to 2450° C. As the ceramic powder, for example, alumina (melting point: about 2015° C.), zirconia (melting point: about 2420° C.), etc. are used.

Also, the time required for the thermal spray material to reach its melting point can be estimated depending on the material used. However, this time varies depending on the average particle size of the thermal spray material. It is noted that the average particle diameter refers to the volume average diameter based on the effective diameter. The average particle diameter is measured, for example, by a laser diffraction/scattering method or a dynamic light scattering method.

Furthermore, the supply port 25-*a* of the thermal spray material introduction pipe 25 may be adjusted only when the plasma thermal spraying device 10 is operated. However, in order to more efficiently melt the thermal spray powder and form a coating C of the thermal spray powder on the surface of the substrate M, this may be carried out periodically or continuously after operation, depending on the degree of melting of the thermal spray powder.

The plasma generation gas supply passage 26 is a passage for supplying the plasma generation gas 45 from the outer peripheral side of the cathode 36 to the discharge space S formed between the anode 41 and the cathode 36. The plasma generation gas supply passage 26 is formed inside the inner cylinder 32 and the anode 41.

In particular, for example, as shown in FIGS. 1 and 2, this plasma generation gas supply passage 26 is adapted to supply plasma generation gas 45 from between the fourth magnet M4 and the outer circumference of the cathode 36 to between the first discharge surface 39 of the cathode 36 and the second discharge surface 49 of the anode 41.

Here, as the plasma generation gas 45, a gas containing one or more selected from the group including rare gas elements, nitrogen ($N_2$), hydrogen ($H_2$), and $CO_2$ can be used. Argon (Ar), helium (He), or the like can be used as the rare gas element. Gases containing components composed of diatomic molecules such as $N_2$ and $H_2$ cause severe damage to the cathode 36 or the anode 41, thus, from the viewpoint of preventing shortening of a life of the cathode 36 or the anode 41, it is generally not preferable to use these.

However, as explained later, in this embodiment, the plasma arc is rotated in the radial direction so that the discharge points of the cathode 36 and the anode 41 are not concentrated at one point on the cathode 36 and the anode 41, respectively. Therefore, as the plasma generation gas 45, a gas containing a component composed of diatomic molecules, such as $N_2$ gas or $H_2$ gas, can also be effectively used.

Furthermore, the temperature of the plasma jet generated in the discharge space S decreases as it approaches the nozzle opening 21*a*, and rapidly decreases in the region beyond the nozzle opening 21*a*. However, gases such as $N_2$ gas and $H_2$ gas that are composed of diatomic molecules have a slow temperature drop, compared to gases composed of monoatomic molecules such as rare gas elements, which have a rapid temperature drop during the process of returning from the plasma state to the original neutral gas.

Therefore, by using a gas composed of diatomic molecules as the plasma generation gas 45, it is possible to widen the heating area that is effective for melting the sprayed powder. Thus, the effective heating region of the plasma in which the sprayed powder is molten can be extended while suppressing damage on the cathode 36 and the anode 41.

Also, for example, as shown in FIGS. 1 and 2, the sheath gas supply passage 101 is configured to supply the sheath gas SG from the sheath gas supply port 101*a*, from around the supply port 25-*a* of the thermal spray material introduction pipe 25 toward the discharge space S.

It is noted that a plurality of sheath gas supply ports 101*a* of this sheath gas supply passage 101 may be provided at equal intervals around the supply port 25-*a* of the thermal spray material introduction pipe 25, for example.

It is noted that the sheath gas SG is, for example, a gas containing one or more selected from the group containing rare gas elements, nitrogen, and hydrogen. That is, the sheath gas SG may be the same gas as the plasma generation gas 45 described above. However, the sheath gas SG may be a different gas from the plasma generation gas 45.

In this way, the sheath gas supply passage 101 supplies the sheath gas SG from around the supply port 25-*a* of the thermal spray material introduction pipe 25 toward the discharge space S from the sheath gas supply port 101*a*. As a result, even if the generated plasma is unstable, the thermal spray material introduction pipe 25 is prevented from momentarily becoming a discharge path, and no discharge current is allowed to flow into the thermal spray material introduction pipe. Then, it is possible to suppress melting of the thermal spray material introduction pipe 25.

Also, for example, as shown in FIGS. 1 and 2, the cooling water supply passages 27-1 to 27-3 are passages for cooling the members constituting the plasma torch 11. In this embodiment, the cooling water supply passage 27-1 is formed inside the inner tube 32, inside and outside the anode 41, and between the outer tube 31 and the inner tube 32. A cooling water supply passage 27-2 is formed inside the inner cylinder 32 and inside the cathode 36. A cooling water supply passage 27-3 is formed inside the thermal spray material introduction pipe 25.

Also, for example, as shown in FIG. 1, the other end of the torch body 21 is connected to a plasma generation gas introduction joint 51 that supplies plasma generation gas 45 to the radial outer circumference of the thermal spray material introduction pipe 25, a first water supply joint 52 that supplies cooling water W to the anode 41, a first drainage joint (not shown) that discharges the cooling water W used for heat exchange at the anode 41, a second water supply joint (not shown) that supplies cooling water W, a second drainage joint (not shown) that discharges the cooling water W used for heat exchange at the cathode 36, a water supply passage 53 that supplies cooling water W into the thermal spray material introduction pipe 25, and a drainage passage 54 for discharging the cooling water W used for heat exchange in the thermal spray material introduction pipe 25, respectively.

The cooling water W suppled to the water supply joint 52-*a* passes inside the inner cylinder 32, outside the anode 41, and between the outer cylinder 31 and the inner cylinder 32, is used for heat exchange, and is drained through the drainage joint 52-*b*. Also, the cooling water W supplied to the water supply joint 52-*c* passes inside the inner cylinder 32 and the cathode 36, used for heat exchange, and is drained through the drainage joint 52-*d*. Also, the cooling water supplied to the water supply passage 53 passes inside the thermal spray material introduction pipe 25, is used for heat exchange, and is drained through the drainage passage 54.

Power Supply

The power supply 12 is a DC power supply that applies voltage between the cathode 36 and the anode 41.

Thermal Spray Material Conveyance Device

The thermal spray material conveyance device 13 conveys thermal spray material powder to the thermal spray material introduction pipe 25, and supplies the thermal spray material to the thermal spray material introduction pipe 25 with the thermal spray powder entrained in the carrier gas G.

In the plasma torch 11 of such plasma thermal spraying device 10, arc discharge is generated in the discharge space S by applying a voltage from the power source 12 between the cathode 36 and the anode 41. By supplying the plasma generation gas 45 to the discharge space S, the plasma generation gas 45 is given energy, becomes a plasma state, and generates a current (discharge current) X between the electrodes. Immediately after the discharge current X is generated, a columnar plasma arc is generated on the surfaces of the cathode 36 and the anode 41 at points where energy consumption is minimized.

For example, a plasma arc between the cathode 36 and the anode 41 occurs on the surfaces of the cathode 36 and the anode 41, as shown in FIG. 5, for example. On the other hand, magnetic flux is generated between the cathode 36 and the anode 41 by the first to fourth magnets 37, 42, M3, and M4 arranged outside the discharge space S in the radial direction. When this current and magnetic flux intersect, the magnetic field acts on the current and generates a rotational force according to Fleming's left-hand rule. Due to this rotational force, the plasma arc moves the discharge point (cathode point) along the first discharge surface 39 of the cathode 36 and rotates. Thereby, the plasma arc similarly moves and rotates the discharge point (anode point) of the anode 41 along the second discharge surface 49 of the anode 41.

In this way, the generated plasma arc rotates the circumferential direction with respect to the central axis T of the plasma torch 11 due to the action of the magnetic field.

Here, as mentioned above, the cathode 36 is arranged in mirror image (plane symmetric) with the anode 41 with respect to the plane R passing between the cathode 36 and the anode 41 and orthogonal to the central axis T. Furthermore, as shown in FIG. 2, the first discharge surface 39 of the cathode 36 is positioned as a mirror image (plane symmetric) of the second discharge surface 49 of the second magnet 41 with respect to the plane R.

Furthermore, with respect to the plane R, the first magnet 37 is arranged in mirror image (plane symmetric) with respect to the third magnet M3. Furthermore, the vector of the magnetic flux of the magnetic field of the first magnet 37 is positioned as a mirror image (plane symmetric) of the vector of the magnetic flux of the magnetic field of the third magnet M3 with respect to the plane R.

Furthermore, with respect to the plane R, the second magnet 42 is arranged in mirror image (plane symmetric) with respect to the fourth magnet M4. Furthermore, with respect to the plane R, the vector of the magnetic flux of the magnetic field of the second magnet 42 is positioned as a mirror image (plane symmetric) of the vector of the magnetic flux of the magnetic field of the fourth magnet M4.

With such a configuration, for example, as shown in FIG. 6, the vector, of the current X that is passed between the first discharge surface 39 of the cathode 36 and the second discharge surface 49 of the anode 41 in order to generate plasma P, and the vector, of magnetic flux of the combined magnetic field of the first magnet 37, the second magnet 42, the third magnet M3, and the fourth magnet M4, are orthogonal to each other.

As a result, the plasma arc can rotate more stably continuously. In other words, it is possible to stabilize the rotation of the discharge of discharge by maintaining the orthogonal of the current and magnetic flux of magnetic flux to generate plasma. The consumption of the thermal spray material introduction pipe can be suppressed by avoiding the inflow of discharge current to the thermal spray material introduction pipe.

Due to such a function of the plasma torch 11, a plasma arc that stably rotates at high speed becomes a plasma jet generated from the circular end face of the cathode 36, and is ejected from the nozzle opening 21*a*.

In addition, the plasma torch 11 positions the supply port 25-*a* of the thermal spray material introduction pipe 25 on the central axis of the cathode 36, and adjustments so that the thermal spray powder is supplied from the supply port 25-*a* onto the central axis T of the plasma jet. Therefore, the spray powder can be supplied onto the central axis T of the plasma jet. As mentioned above, the temperature distribution of the plasma jet is such that the central portion of the plasma jet is at an extremely high temperature of 10,000° C. or more, and the surrounding area is at a high temperature of approximately 1500 to 2000° C. Therefore, by supplying thermal spray powder onto the central axis of the plasma jet from behind the plasma jet, the thermal spray powder is taken into the center of the vortex flow of the plasma arc rotating at high speed. Therefore, the thermal spray powder can be molten by the extremely high temperature heat of the central portion of the plasma jet and discharged from the nozzle port 21*a*.

According to this embodiment, the plasma torch 11 adjusts the position at which the sprayed powder is supplied into the discharge space S depending on the type of sprayed powder. Thereby, regardless of the degree of difficulty in melting the thermal spray material, for example, 90% or more of the thermal spray material supplied from the thermal spray material conveyance device 13 can be used to form the film, so that it is discharged from the nozzle port 21*a* in a completely molten state and directed toward the substrate M without adhering to the inner wall of the discharge space S.

In this way, in the plasma torch 11, the thermal spray material introduction pipe 25 is provided inside the cathode 36, adjusting the position of the tip of the thermal spray material introduction pipe 25 based on the position at which melting of the thermal spray material is completed, determined in advance depending on the type of thermal spray material.

Then, while rotating the plasma, the thermal spray material is controlled to be supplied onto the central axis T of the plasma jet from the supply port 25*a* located on the central axis of the cathode 36. As a result, the plasma torch 11 melts the sprayed powder supplied onto the central axis T of the plasma jet by drawing it into the center of the vortex of the plasma arc rotating at high speed and form the film by ejecting the molten thermal spraying powder from the nozzle port 21-*a* while suppressing the adhesion of the molten thermal spraying powder to the discharge surface 41-*a* of the anode 41.

For this reason, since the plasma torch 11 can increase the melting efficiency of the soluble powder, for example, to 90% or more, for example, the solution powder supplied from the thermal spray material converted device 13, regardless of the difficulty of melting thermal spray material, the melting efficiency of thermal spray material can be improved stably, and damage on the cathode 36 and the anode 41 can be suppressed.

In addition, the anode and cathode points of the plasma arc are forcibly driven and moved, and the concentration of the polar point is suppressed that damage occurs in the cathode 36 and the anode 41. As a result, the life of the cathode 36 and the anode 41 can be improved, and the occurrence of contamination due to the damage on the cathode 36 and the anode 41 can be suppressed.

Furthermore, the plasma arc rotates to suppress the concentration of the poles. For this reason, even if the gas composed of diatomic molecules such as $N_2$ gas and $H_2$ gas is used as the plasma generation gas, an operating cost can be reduced and damage to the cathode 36 and the anode 41 can be suppressed.

Furthermore, the plasma torch 11 can spread the area of melting the solution powder by using the gas composed of diatomic molecules as a gas 45 plasma generation gas 45. For this reason, while suppressing the damage on the cathode 36 and the anode 41, the effective heating area of the plasma in which the thermal spray material is molten may be prolonged.

In this way, the plasma thermal spraying device 10, which has the plasma torch 11, can use the plasma to form a variety of thermal spray material films more efficiently on the surface of the substrate M to further improve the solution efficiency.

Then, as already mentioned, with respect to the plane R passing between the cathode 36 and the anode 41 and orthogonal to the central axis T, the cathode 36 and the anode 41 are arranged in mirror image (plane symmetric). Furthermore, the first magnet 37 and the third magnet M3 are arranged in mirror image (plane symmetric), and the vector of the magnetic flux of the magnetic field of the first magnet 37 and the vector of the magnetic flux of the magnetic field of the third magnet M3 are arranged in mirror image (plane symmetric). Furthermore, the second magnet 42 and the fourth magnet M4 are arranged in mirror-image (plane symmetric), and the vector of the magnetic flux of the magnetic field of the second magnet 42 and the vector of the magnetic flux of the magnetic field of the fourth magnet M4 are positioned as mirror images (plane symmetric).

Figure 7A:
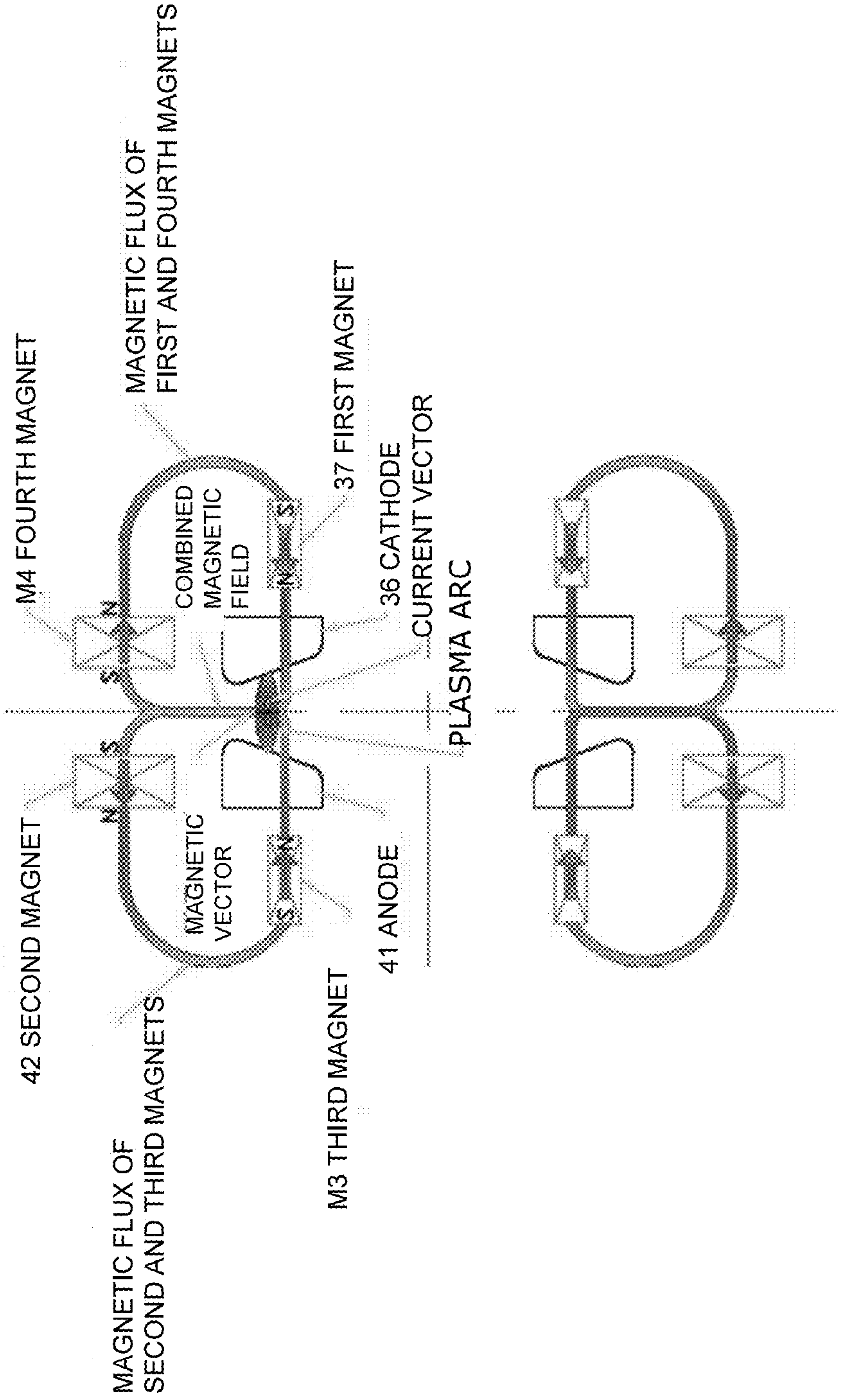
FIG. 7A is a diagram showing an example of a positive electrode arrangement.
Figure 7B:
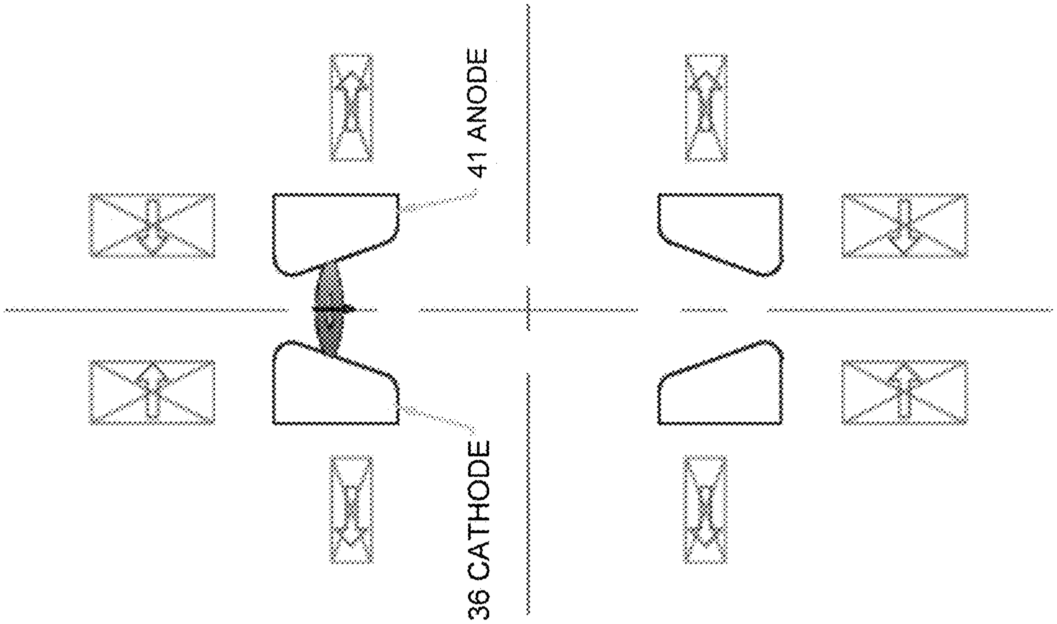
FIG. 7B is a diagram showing an example of an electrode arrangement of opposite polarity.

Here, it is explained using FIGS. 7*a* and 7B, why the shape and arrangement of electrodes and magnets in this embodiment lead to a stabilization of a vector product between the current of the plasma space and the magnetic field in the same space.

For example, the left and right mirror-image composite magnetic fields generated by the first and fourth magnet sets and the third and second magnet sets placed in the cathode and anode sections, respectively, collide closely on the left-right symmetrical plane between the cathode and anode gaps (FIG. 7A) or downward (FIG. 7B) and orthogonal to the current flowing between the two poles. Then, when the voltage is applied between the electrodes, discharge starts at the upper end minimum gap between the electrodes, and the current flowing through the generated plasma is pushed downward by the gas pressure flowing from above to between the electrodes but pushed back by the pressure of the sheath gas flowing at the lower end of the electrode and the powder carrier gas, thus remains in a position where the pressure is balanced maintaining discharge, and rotates under the force of direction and magnitude expressed by a vector product of current and magnetic field at that position. In the example of FIG. 7A, the force is clockwise when viewed from the front of the figure, that is, from the left, and in the example of FIG. 7B, the polarity is reversed, but the magnetic field also switches up and down. Thus, the magnitude and direction of the acting force remain unchanged, and the direction of rotation becomes clockwise.

By such a configuration, the vector, of current X flowing between the first discharge surface 39 of the cathode 36 and the second discharge surface of the anode 41 to generate plasma P, and the vector, of magnetic flux of synthesized magnetic fields in the first magnet 37, second magnet 42, third magnet M3, and fourth magnet M4, are orthogonal.

This allows the plasma arc to rotate continuously and more stably. In other words, by maintaining the vector product of the current for generating plasma and the magnetic flux of the magnetic field to be orthogonal, it is possible to stabilize the rotation of the pole of the discharge, and this prevents discharge current from flowing into the thermal spray material introduction pipe, thereby suppressing damage on the thermal spray material introduction pipe.

Furthermore, as described above, the sheath gas supply passage 101 supplies the sheath gas SG from the sheath gas supply port 101*a* toward the discharge space S from around the supply port 25-*a* of the thermal spray material introduction pipe 25. Even if the generated plasma is unstable, the thermal spray material introduction pipe 25 is prevented from momentarily becoming a discharge path. No discharge current will flow into the thermal spray material introduction pipe, and it is possible to suppress melting of the thermal spray material introduction pipe 25.

As described above, the present invention can stabilize the rotation of the pole of discharge by maintaining orthogonality of the vector product of the current for generating plasma and the magnetic flux of the magnetic field and can suppress damage on the thermal spray material introduction pipe. Thermal spray powder can be discharged from the thermal spray material introduction pipe to the outside without causing the thermal spray material to adhere to the discharge surface of the anode. From improving the melting efficiency of thermal spray materials, for example, this can be suitably applied to abrasion-resistant thermal spray coating on the surface of a calender roll, purification of silicon for solar cells, insulation coating of large plasma display panels, and the like. Furthermore, as described above, the plasma torch according to the present invention is not limited to being applied to thermal spraying devices, but can be applied to a wide variety of applications such as melting and gas heating.

It is noted that in this embodiment, a cathode (first electrode) and an anode (second electrode) are used as a cathode and an anode, respectively. However, the polarities of the first electrode and the second electrode may be changed by switching the polarities of the power supplies.

Furthermore, in this embodiment, a case has been described in which the plasma torch is applied to a plasma thermal spraying device, but the present invention is not limited to this, and the plasma torch can also be applied to a particle manufacturing device.

DESCRIPTION OF REFERENCE

10 Plasma thermal spraying device
11 Plasma torch
12 DC power supply
13 Thermal spray material conveyance device (thermal spray material conveyance section)
21 Torch body
S Discharge space

The invention claimed is:

1. A plasma torch that rotates a generated plasma along a central axis, ejects the plasma in an axial direction, melts powder of a thermal spraying material with the plasma, and expels the molten powder from a front nozzle opening, the plasma torch comprising:

- a first electrode formed in a cylindrical shape having a first through hole extending in the axial direction at a center, the first electrode having a first discharge surface continuously formed around a front end of the first through hole;
- a second electrode formed in a cylindrical shape having a second through hole extending in the axial direction at a center and located on a front side of the first electrode, the second electrode having a second discharge surface continuously formed around a rear end of the second through hole so as to face the first discharge surface of the first electrode;
- a first magnet provided on a rear side of the first electrode opposite to the first discharge surface;
- a second magnet provided on an outer periphery of the second electrode;
- a third magnet provided on a front side of the second electrode opposite to the second discharge surface;
- a fourth magnet provided on an outer periphery of the first electrode and facing the second magnet in the axial direction;
- a thermal spray material introduction pipe slidably provided in the first through hole along the central axis, that supplies thermal spray material powder from a supply port to a discharge space formed between the first electrode and the second electrode; and a plasma generation gas supply passage that supplies plasma generation gas to the discharge space from the outer peripheral side of the first electrode, wherein a vector, of current flowing between the first discharge surface of the first electrode and the second discharge surface of the second electrode to generate the plasma, and a vector, of magnetic flux of a combined magnetic field generated by the first magnet, the second magnet, the third magnet, and the fourth magnet, are orthogonal.

2. The plasma torch according to claim 1, wherein the first electrode is arranged as a mirror image of the second electrode with respect to a plane passing between the first electrode and the second electrode and orthogonal to the central axis, and wherein the first discharge surface of the first electrode is positioned as a mirror image of the second discharge surface of the second electrode with respect to the plane.

3. The plasma torch according to claim 2, wherein the first magnet is arranged as a mirror image of the third magnet with respect to the plane, and wherein the vector of magnetic flux of the magnetic field of the first magnet is positioned as a mirror image of the vector of magnetic flux of the magnetic field of the third magnet with respect to the plane.

4. The plasma torch according to claim 3, wherein the second magnet is arranged as a mirror image of the fourth magnet with respect to the plane, and wherein the vector of magnetic flux of the magnetic field of the second magnet is a mirror image of the vector of magnetic flux of the magnetic field of the fourth magnet with respect to the plane.

5. The plasma torch according to claim 2, wherein the first magnet is arranged inside the first electrode in a region between the first through hole and the outer periphery, and wherein the third magnet is arranged inside the second electrode in a region between the second through hole and the outer periphery.

6. The plasma torch according to claim 5, wherein the fourth magnet is continuously formed so as to surround the front end of the first electrode, and wherein the second magnet is continuously formed so as to surround the rear end of the second electrode.

7. The plasma torch according to claim 6, wherein the first magnet has a cylindrical shape with a through hole extending in the axial direction centered on the central axis, wherein the second magnet has a cylindrical shape with a through hole extending in the axial direction centered on the central axis, wherein the third magnet has a cylindrical shape with a through hole extending in the axial direction centered on the central axis, and wherein the fourth magnet has a cylindrical shape with a through hole extending in the axial direction centered on the central axis.

8. The plasma torch according to claim 2, wherein the first discharge surface of the first electrode and the second discharge surface of the second electrode are inclined, such that a gap between the first discharge surface of the first electrode and the second discharge surface of the second electrode widens toward the central axis.

9. The plasma torch according to claim 2, wherein a magnitude of the inclination of the first discharge surface with respect to the plane orthogonal to the central axis is the same as a magnitude of the inclination of the second discharge surface with respect to the plane.

10. The plasma torch according to claim 1, wherein the plasma generation gas supply passage supplies the plasma generation gas, from between the fourth magnet and the outer periphery of the first electrode, toward between the first discharge surface of the first electrode and the second discharge surface of the second electrode.

11. The plasma torch according to claim 1, further comprising a sheath gas supply passage that supplies sheath gas from a sheath gas supply port toward the discharge space from around the supply port of the thermal spray material introduction pipe.

12. The plasma torch according to claim 11, wherein a plurality of the sheath gas supply ports of the sheath gas supply passage are provided at equal intervals, around the supply port of the thermal spray material introduction pipe.

13. The plasma torch according to claim 11, wherein the sheath gas is the same gas as the plasma generation gas or a different gas from the plasma generation gas.

14. The plasma torch according to claim 11, wherein the sheath gas is a gas containing one or more selected from a group containing noble gas elements, nitrogen, and hydrogen.

15. The plasma torch according to claim 1, wherein a position of the supply port of the thermal spraying material introduction pipe is adjusted depending on the type of the thermal spraying material.

16. The plasma torch according to claim 15, wherein the position of the supply port of the thermal spray material introduction pipe is adjusted so that the position of the supply port is within the discharge space.

17. A plasma thermal spraying device comprising:

the plasma torch according to claim 1;

a power source that applies a voltage between the first electrode and the second electrode; and a thermal spray material conveyance unit that conveys the thermal spray material to the thermal spray material introduction pipe.

18. A control method for a plasma torch, by using the plasma torch according to claim 1, by sliding the thermal spraying material introduction pipe in the axial direction and adjusting the position of the supply port of the thermal spraying material introduction pipe according to the type of the thermal spraying material, to melt the powder of the thermal spray material.

* * * * *